May 26, 1936.  J. B. HULL  2,042,101
FLUID PRESSURE BRAKE
Filed May 9, 1934
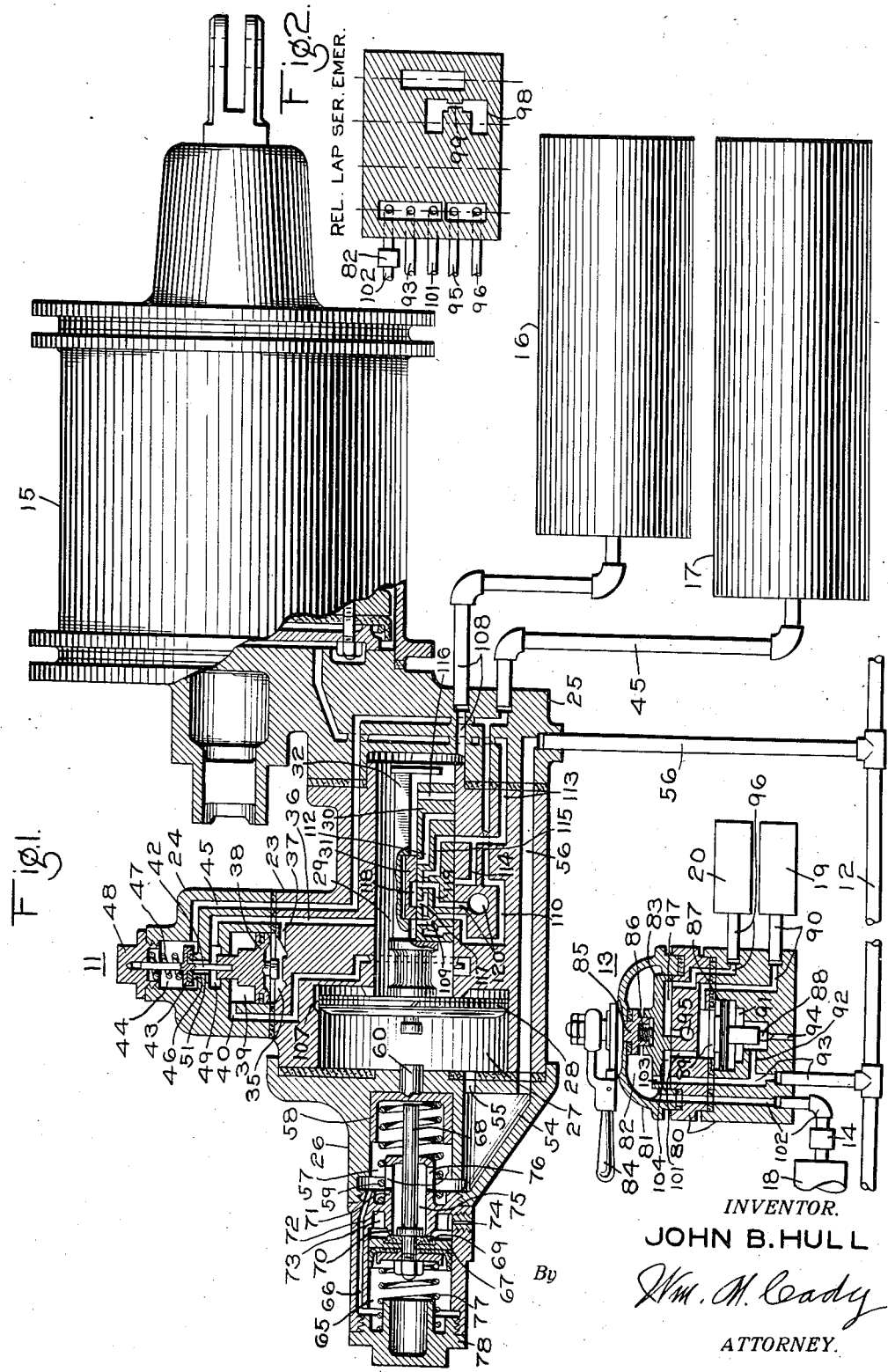
INVENTOR.
JOHN B. HULL
By Wm. M. Cady
ATTORNEY.

Patented May 26, 1936

2,042,101

UNITED STATES PATENT OFFICE 2,042,101

FLUID PRESSURE BRAKE

John B. Hull, Berkeley, Calif., assignor to The Westinghouse Air Brake Company, Wilmerding, Pa., a corporation of Pennsylvania Application May 9, 1934, Serial No. 724,666

17 Claims. (Cl. 303—42)

This invention relates to fluid pressure brakes and particularly to brake controlling valve devices therefor.

Under certain conditions it is desirable to effect service applications of the brakes with greater rapidity than present brake controlling devices permit, in order to obviate the necessity for an emergency application of the brakes with its consequent penalty of greater release time and greater amount of recharge fluid, as well as of shock and discomfort to passengers.

Present fluid pressure brake controlling devices are so designed that any substantial increase in the rate of brake pipe pressure reduction over the usual service rate of reduction effects an emergency application of the brakes. It is thus impossible to increase the rapidity of a service application, when employing present standard brake controlling devices, by increasing the rate of brake pipe pressure reduction any substantial degree beyond the usual service rate of reduction.

It is the principal object of my invention, therefore to enable service applications of the brakes to be effected with greater rapidity than heretofore by providing a fluid pressure brake controlling device which is responsive to a brake pipe pressure reduction at any rate in excess of the usual service rate of reduction to effect a service application of the brakes without the possibility of an emergency application of the brakes being effected.

Another object of my invention is to provide means for simply and inexpensively adapting present standard brake controlling devices to operate as stated in the principal object explained above.

A further object of my invention is to provide a fluid pressure brake controlling device of the character as above described which is unresponsive to any rate of brake pipe pressure reduction to effect an emergency application of the brakes unless a predetermined reduction in brake pipe pressure has been effected.

A still further object of my invention is to provide a fluid pressure brake apparatus, including a brake controlling device of the character as above described, wherein the reduction in brake pipe pressure for a service application is automatically limited to a predetermined maximum amount and an undesired emergency application of the brakes thereby prevented.

Other objects and advantages of my invention will be made apparent in the subsequent description of one illustrative embodiment thereof, when read in connection with the accompanying drawing, wherein Fig. 1 is a view, partly in section, showing the essential features of one embodiment of my invention with the equipment in release position.

Fig. 2 is a diagrammatic view, showing the various connections established by the brake valve of Fig. 1, when in the several brake operating positions.

Referring to Fig. 1, the embodiment shown may comprise any brake controlling valve mechanism, such as the triple valve mechanism 11, which is connected to a brake pipe 12, a brake valve 13, a feed valve 14, a brake cylinder 15, an auxiliary reservoir 16, a supplementary reservoir 17, a main reservoir 18, an equalizing reservoir 19, and a reduction limiting reservoir 20.

The triple valve mechanism 11 may comprise four casing sections, namely a slide valve section 23, a high pressure valve section 24, a pipe connecting bracket section 25, and an emergency blocking valve section 26.

Casing section 23 contains a chamber 27 connected to brake pipe 12 and having a piston 28 operable therein, and a chamber 29 connected to the auxiliary reservoir 16 and containing a main slide valve 30 and an auxiliary slide valve 31, both adapted to be operated by the piston 28 through a stem 32 in the usual manner.

The casing section 24 contains a chamber 35 continuously connected to slide valve chamber 29 through a passage 36 and branch passage 37 and having a piston 38 operable therein, a chamber 39 at the opposite side of the piston 38 also being provided which is also connected to the slide valve chamber 29 through a passage and port 40. The port 40 is under the control of main slide valve 30 which operates to vent chamber 39 when moved to emergency position in the manner hereinafter described.

The piston 38 is provided with a stem 42 by means of which it is adapted to operate a valve 43 contained in a chamber 44 which is continuously connected to the supplementary reservoir 17 through a passage and pipe 45. Valve 43 is adapted to be biased into seating relation on an annular rib seat 46 when the pressures in chambers 35 and 39 on opposite sides of piston 38 are equal, by a spring 47 disposed in chamber 44 between the valve 43 and a suitable screw plug 48, which plug closes the chamber 44 and is adjustable to vary the tension of spring 47.

Intermediate of the chambers 39 and 44 is a chamber 49, which is continuously connected to the slide valve chamber 29 through passage 36 and which is adapted to be connected to chamber 44, when valve 43 is unseated, through a passage 51 leading from chamber 49 to the inner seated area of valve 43. Thus when valve 43 is unseated, the supplementary reservoir 17 is connected to slide valve chamber 29.

The casing section 25 contains various passages for establishing the necessary connections to the brake pipe 12, to the brake cylinder 15, to the auxiliary reservoir 16 and to the supplementary reservoir 17, as hereinafter described.

The casing section 26, embodying the principal feature of my invention, may contain a chamber 54 open to the piston chamber 27 through one or more ports 55 and connected to the brake pipe 12 through passage and pipe 56, and a chamber 57 open to chamber 54 and containing a stop member 58, which is normally biased against the end wall of casing section 26 by a spring 59, and which is provided with an extension 60 that passes through a closely fitted opening in the end wall of the casing section 26 into piston chamber 27. The extension 60 of stop member 58 is disposed in axial alignment with the piston 28 and is adapted to be engaged thereby upon a brake application as hereinafter described.

Casing section 26 also contains a chamber 65 connected to chamber 57 through a passage 66 and having therein a piston valve 67 provided with a stem 68 which is suitably supported in axial alignment with extension 60 of the stop member 58 and which is of such length that the end thereof is spaced from the inner surface of the stop member 58 a short distance.

The piston valve 67 is provided, on the side opposite chamber 65 with a sealing gasket 69 adapted to engage an annular seat rib 70 at the end of a hollow tubular portion 71 of the casing 26, which tubular portion 71 is supported by an annular imperforate rib or wall 72 separating chamber 57 on one side thereof and another chamber 73 open to atmosphere through a choke passage 74. The interior of the tubular portion 71 constitutes a passage 75 which is open to chamber 57 at one end through ports 76.

It will thus be seen that piston valve 67 is subject to the differential of the brake pipe pressure in chamber 65 acting on entire outer face of the piston, and the brake pipe pressure acting on the inner seated area of the piston valve 67, the outer seated area of piston valve 67 being subject only to atmospheric pressure. Piston valve 67 is thus maintained in sealing relation on seat rib 70 by the excess pressure in chamber 65, aided to some extent by a spring 77 disposed in chamber 65 between the piston valve and a screw plug 78 closing the end of chamber 65. Spring 77 is primarily designed to effect return movement of piston valve 67 into sealing engagement with seat rib 70, as will be hereinafter pointed out.

The spring 59 and stop member 58 may be omitted, if desired, and the stem 68 extended in length to protrude through the opening in the casing wall into piston chamber the same distance as extension 60 of the stop member. Spring 59 and stop member 58, when employed, act however to soften the initial blow of the piston upon a brake application. The end of stem 68 is spaced a short distance from the back surface of stop member 58 to insure proper and full seating of piston valve 67 on rib seat 70.

The brake valve 13 is of usual construction, being illustrated for simplicity as comprising only those features essential to the operation of the system disclosed. Briefly, however, it comprises the usual plurality of main body casing sections 80 suitably secured in sealed relation and a cap section 81 enclosing a chamber 82 above the uppermost section 80, in which chamber a rotary valve 83 is disposed, the valve 83 being operated manually into the usual brake operating positions, as illustrated in Fig. 2, by a lever or handle 84 through a stem 85 projecting through a sealed opening in the cap section 81 and suitably interlocked with the rotary valve 83. The stem 85 has a recess in the end thereof in which a spring 86 is disposed to urge a collar or flange on the valve stem 85 in sealing contact against the cap section 81 of the casing.

Contained within the brake valve sections 80 is an equalizing piston 87 for operating a vent valve 88, the piston 87 having at one side an equalizing chamber 89 which is continuously connected to the equalizing reservoir 19 through a passage and pipe 90, and at the other side a chamber 91 which is continuously open to the brake pipe 12 through passages 92 and 93. When the fluid pressure in chamber 91 exceeds that in equalizing chamber 89, the piston 87 is raised and unseats vent valve 88 so that the brake pipe and chamber 91 are vented to atmosphere through an exhaust passage and port 94 which may be of an area so as to effect any desired rate of brake pipe pressure reduction in excess of the usual service rate.

An exhaust port and passage 95 opens at the rotary valve seat and the reduction limiting reservoir 20 is connected thereto in the release position of the brake valve, by a pipe and passage 96 and a cavity 97 in the rotary valve, as shown in Fig. 1.

With the brake valve 83 in service application position, as shown in Fig. 2, the reduction limiting reservoir 20 is connected to the equalizing chamber 89 and equalizing reservoir 19 through pipe and passage 96, a cavity 98 in the rotary valve 83 which cavity contains a restricted opening 99 (see Fig. 2), and a passage 101. The restricted opening 99 controls the rate of flow of fluid from the equalizing reservoir 19 to the reduction reservoir 20, and thus controls the operation of the equalizing piston 87 to vary the rate of opening vent valve 88.

The brake pipe 12 is charged with fluid under pressure from main reservoir 18, through feed valve 14, pipe and passage 102, chamber 82 of brake valve 13, port 103 in the rotary valve 83 and passage and pipe 93. The equalizing chamber 89 and the equalizing reservoir 20 are charged with fluid at brake pipe pressure through cavity 104 opening into port 103 of the rotary valve 83, and passage 101, while chamber 91 beneath the equalizing piston 87 is also charged with fluid at brake pipe pressure through passage 92 connected to pipe and passage 93. The pressures on opposite sides of equalizing piston 87 being thus balanced, the piston 89 maintains vent valve 88 seated or closed.

Fluid under pressure flows from the brake pipe 12 to piston chamber 27 through pipe and passage 56, chamber 54 and ports 55, and continues on past the piston 28 through the usual feed groove 107 into slide valve chamber 29. From the slide valve chamber 29, fluid flows to the auxiliary reservoir 16 through passage and pipe 108, and to the supplementary reservoir 17 through a port 109 in the main slide valve 30, port and passage 110 in the seat of the slide valve, and passage and pipe 45, thus charging both reservoirs with fluid at brake pipe pressure. Valve chamber 44, being connected to the supplementary reservoir 17, is thus also charged with fluid under pressure, as are chambers 35 and 39 which are connected to the slide valve chamber as described above.

The pressures on opposite sides of piston 38 being equal, spring 47 is effective to bias valve 43 into seated or closed position.

Fluid under pressure from chamber 54 also flows into chamber 57 and from thence through passage 66 into chamber 65 so that piston valve 67 is caused to seat firmly on the rib seat 70, the fluid under pressure from chamber 54 supplied through ports 76 and passage 75 and effective on the inner seated area of the piston valve being overbalanced by the pressure effective on the outer area thereof in chamber 65.

If it be desired to effect a service application of the brakes, the brake valve 13 is moved to the usual service application position wherein the equalizing reservoir 19 is connected to the reduction limiting reservoir 20, as above described and as shown in Fig. 2. Fluid under pressure is thus supplied to the reduction limiting reservoir at a rate dependent upon the size of the restricted opening 99 in cavity 98 of the rotary valve 83. As the pressure in equalizing chamber 89 reduces, equalizing piston 87 is forced upwardly by the brake pipe pressure effective in chamber 91 beneath the piston, causing vent valve 88 to unseat and vent fluid under pressure from the brake pipe through exhaust port 94, so that brake pipe pressure is reduced at a relatively rapid rate in excess of the usual service rate in accordance with the particular size of port 94 employed.

The reduction in brake pipe pressure at a relatively rapid rate in excess of the usual service rate causes the fluid pressure in piston chamber 27 to reduce accordingly, whereupon the fluid pressure in slide valve chamber 29 causes rapid movement of the piston 28 to the left, as viewed in Fig. 1, until the piston strikes extension 60 of stop 58. In view of the relatively rapid reduction in piston chamber pressure, the unbalance of fluid pressure exerted on piston 28 from slide valve chamber 29 is sufficient to cause the piston to continue to move to the left after striking the extension 60 and compress the spring 59 until stop member 58 strikes the end of stem 68, which prevents further movement of piston 28 to the left, due to the effective fluid pressure acting on the outer area of piston valve 67 in chamber 65.

Initial movement of piston 28 to the left causes auxiliary slide valve 31 to close port 109, thereby cutting off the supplementary reservoir 17 from slide valve chamber 29, and to uncover the service port 112 in the main slide valve 30 at the seat of the auxiliary slide valve. Further movement of the piston causes the main slide valve 30 to move and establish a communication for the supply of fluid under pressure to the brake cylinder 15 from auxiliary reservoir 16, through passage 108, slide valve chamber 29, port 112 in the main slide valve, and port and passage 113.

In view of the greater rapidity of brake pipe pressure reduction as compared to the usual service rate of reduction, and the corresponding greater rapidity with which the main slide valve 30 is moved to its service position, as just described, fluid is immediately and rapidly supplied to the brake cylinder to effect an application of the brakes in a shorter time than is effected thereby in response to the usual service rate of reduction in brake pipe pressure.

When a desired amount of reduction in brake pipe pressure has been effected, brake valve 13 is moved to lap position wherein all communications are closed, as shown in Fig. 2, including that between the equalizing reservoir and the reduction limiting reservoir.

When brake pipe pressure acting in chamber 91 beneath equalizing piston 87 decreases below the equalizing reservoir pressure effective in equalizing chamber 89 above the equalizing piston, the latter pressure is effective to move the equalizing piston 87 downwardly to immediately close vent valve 88 and cut off further reduction in brake pipe pressure.

As soon as the fluid pressure in slide valve chamber 29 falls below the brake pipe pressure effective in piston chamber 27, piston 28 is moved back until a shoulder on the piston stem 32 engages the left edge of the main slide valve 30, as viewed in Fig. 1, whereupon further movement of the piston 28 is stopped inasmuch as the fluid pressure differential acting to move piston 28 back is insufficient to overcome the friction between the main slide valve and its seat.

The auxiliary slide valve 31 is thus moved back relatively to the main slide valve a sufficient distance to close service port 112 in the main slide valve and cut off the further supply of fluid under pressure through the port 112 to the brake cylinder. The brakes, therefore, are held applied in the desired degree.

In order to obtain a greater degree of service application, the brake valve 13 is again moved to service position, held there until the further degree of brake pipe pressure reduction as desired is effected, and then moved to lap position.

A full service application is obtained by allowing the brake valve 13 to remain in service position until the equalizing reservoir 19 has fully equalized into the reduction limiting reservoir 20. The maximum amount of brake pipe pressure reduction for a service application is thus limited to a predetermined amount as defined by the pressure of equalization attained in equalizing chamber 89 of the brake valve 13 inasmuch as the vent valve 88 is operated to cut off further venting of the brake pipe through port 94 after the brake pipe pressure has reduced to that acting in the equalizing chamber 89.

The capacities of the equalizing and reduction limiting reservoirs may be suitably proportioned to obtain any desired pressure of equalization, but they are preferably proportioned to obtain a pressure of equalization, such as forty-five pounds per square inch, which is a few pounds less than the pressure of equalization between the auxiliary reservoir 16 and brake cylinder 15, in order to ensure a full application of the brakes.

The fluid pressure acting in chamber 65 on the outer area of piston valve 67 and that acting in passage 75 on the inner seated area of the piston valve 67 both reduce simultaneously with the reduction in brake pipe pressure but the effective force of the differential pressure, as determined by the ratio of the outer area of piston valve 67 in chamber 65 to the inner seated area thereof as well as the area of the piston valve itself, is sufficient to hold the piston valve 67 seated on its rib seat 70 as long as the brake pipe pressure does not go below the predetermined set limit, of for example, forty-five pounds per square inch pressure.

Thus, by automatically limiting the amount of the reduction in brake pipe pressure for a service application, it is possible for the brake pipe exhaust port 94 of brake valve 13 to be of any suitable size to effect any desired rate of reduction in brake pipe pressure greater than the usual service rate, without danger of exceeding the predetermined set limit of reduction, below which the piston valve 67 will open to permit an emergency application of the brakes to be effected, as hereinafter described.

At the completion of a full service application, the auxiliary slide valve 31 and main slide valve 30 remain in service position, the excess of pressure in the auxiliary reservoir effective in slide valve chamber 29 over the reduced limit of brake pipe pressure effective in piston chamber 27 maintaining the piston 28 in the service position.

If it is desired to effect an emergency application of the brakes, the brake valve is moved to emergency position, as diagrammatically shown in Fig. 2, wherein both the brake pipe passage 93 and passage 101 leading from the equalizing chamber 89 and equalizing reservoir 19 are connected to the exhaust port and passage 95. As a result, brake pipe pressure is reduced at an emergency rate by simultaneous venting through exhaust port 95 and through vent port 84 which opens when vent valve 88 is unseated by the lifting of the equalizing piston 87.

It will be noted that in the emergency position of the brake valve 13, no connection is established between the equalizing reservoir 19 and the reduction limiting reservoir 20, as in the service position. Consequently brake pipe pressure continues to reduce at the emergency rate as long as the brake valve is maintained in the emergency position.

The reduction in fluid pressure in piston chamber 27 of the triple valve device is initially effective as above described for movement of the brake valve to service position, the piston 28 and slide valve 30 being prevented momentarily from moving beyond a service position into emergency position until the brake pipe pressure effective in piston chamber 27 is reduced a certain amount, such as five pounds, below the predetermined limit of forty-five pounds per square inch set by the reduction limiting device. Obviously piston valve 67 may be so designed to give other marginal values than the five pounds.

When the brake pipe pressure effective in piston chamber 27 is reduced by this marginal value below the predetermined set limit of reduction in brake pipe pressure, the fluid pressure effective in slide valve chamber 29 causes a sufficiently great differential of pressure to act on the piston 28 that the opposing fluid pressure force acting on piston valve 67 is overcome, and the piston valve is unseated from its rib seat 70. When the piston valve 67 is unseated, fluid at brake pipe pressure flows from passage 75 past the rib seat 70 into the annular chamber 73 and thus the fluid under pressure acting on both sides of the piston valve 67 is substantially equalized and the piston 28 is thereby permitted to move positively into emergency position, wherein an emergency application of the brakes is effected, as hereinafter described. The choke passage 74 may be of any suitable flow area adapted to so restrict the venting therethrough of fluid under pressure from chamber 73 at the inner side of the piston valve 67 to atmosphere, that the piston 28 may move positively to emergency application position. It will thus be seen that the marginal decrease of, for example, five pounds below the predetermined reduction limit in brake pipe pressure is for the purpose of preventing the occurrence of an undesired emergency application when only a full service application is intended.

When the main slide valve 30 is in emergency position it establishes a connection between passage 40 leading to high pressure valve chamber 39 and brake cylinder passage 113, through a cavity 115 in the main slide valve 30 and a branch passage 114. Fluid under pressure in chamber 39 thus flows into the brake cylinder, and in so doing reduces the fluid pressure above high pressure valve piston 38 so that the higher auxiliary reservoir pressure in chamber 35 beneath the piston 38 is effective to lift the piston and thus cause the valve 43 to unseat from its rib seat 46.

Fluid under pressure may then be supplied from the supplementary reservoir 17 to the slide valve chamber 29 through pipe and passage 45, past valve 43, through passage 51, chamber 49 and passage 36.

When the main slide valve 30 is in emergency position, a communication is established for the supply of fluid under pressure from slide valve chamber 29 to the brake cylinder 15 through emergency port 116 in the main slide valve 30, and port and passage 113. In view of the fact that both the auxiliary reservoir and the supplementary reservoir are connected to the slide valve chamber 29, the ultimate force of brake application is, therefore, greater for an emergency application than for a service application.

Once the main and auxiliary slide valves have been moved into emergency position, they remain there as long as the handle 84 of the brake valve 13 remains in emergency position and thus cause full equalization of the pressures in the brake cylinder 15, the slide valve chamber 29, the auxiliary reservoir 16, and the supplementary reservoir 17 to be effected. It will be clear that such is the case because of the excess of the pressure in the slide valve chamber 29 over the reduced brake pipe pressure effective in piston chamber 27. Furthermore, due to the fact that the piston valve 67 is held unseated from its annular seat rib 70 by the piston 28 acting through the stem 68, continued reduction in brake pipe pressure at a restricted rate takes place through the choke 74 even if the handle 84 of the brake valve 13 is returned into lap position following the emergency application of the brakes. The brakes thus remain applied until such time as they are released by movement of the brake valve 13 to release position, shown in Fig. 1. In this position of the brake valve 13, the brake pipe and equalizing reservoir are charged with fluid from the main reservoir 18 as previously described, the admission of fluid into piston chamber 27 forcing the piston 28 back into release position wherein the brake cylinder 15 is vented to atmosphere through passage 113, cavity 115 in the main slide valve 30, port 117, cavity 118 in the auxiliary slide valve 31, cavity or passage 119 in the main slide valve and exhaust port and passage 120. It will be noted also that the reduction limiting reservoir 20 is connected to atmosphere through exhaust port and passage 95 so that the fluid previously discharged thereinto is completely vented and the reservoir conditioned for another operation of the brake valve to service position.

Restricted opening or choke 74 is effective on recharge to permit the piston 28 to be moved to release position, in that it so restricts the blowdown or exhaust of brake pipe pressure on the charge or recharge operation, that pressure sufficient to move the piston 28 back to release position is built up in piston chamber 27. The piston valve 67 is thus reseated on the rib seat 70, as the piston 28 moves away from the stop member 58, by the brake pipe pressure effective in chamber 65 assisted by return spring 77.

It is to be noted that while, in effecting an emergency application, a service application is momentarily caused, this is unobjectionable because of the rapidity with which the service application is effected.

It will thus be clear that my invention possesses an advantage over the present standard equipment in that it enables a service application of the brakes to be effected rapidly enough so that an emergency application is not required, also thereby enabling quicker recharging and lesser time to release the brakes than required after an emergency application of the brakes.

Summarizing, my invention comprises essentially a valve device simply and inexpensively adapted to usual brake controlling equipment, which is differentially subjected to brake pipe pressure and which is effective to prevent movement of a brake controlling valve device beyond a service position into emergency position, regardless of the rate of reduction of brake pipe pressure, until at least a predetermined reduction in brake pipe pressure has been effected, in which case it is effective to permit the brake controlling valve device to move into a position for effecting an emergency application of the brakes. Furthermore, by providing a brake pipe pressure reduction limiting device effective when the brake valve is moved to service position, an undesired emergency application is incapable of being effected regardless of the rate of reduction in brake pipe pressure.

While but one embodiment of my invention has been illustrated and described, it will be understood that changes, additions or omissions may be made therein without departing from the spirit of the invention. I desire, therefore, to impose no restrictions as to the scope of my invention except as necessitated by the prior art and as defined in the appended claims.

Having now described my invention, what I claim as new and desire to secure by Letters Patent, is:

1. In a fluid pressure brake, the combination with a brake pipe, a brake cylinder, and a brake controlling valve device movable to a service application position in which fluid under pressure is supplied to the brake cylinder upon a reduction in brake pipe pressure and to an emergency application position in which fluid under pressure is supplied to the brake cylinder upon a sufficiently rapid rate of reduction in brake pipe pressure, of means effective as long as the brake pipe pressure does not reduce below a predetermined uniform pressure for preventing movement of said valve device to emergency application position.

2. In a fluid pressure brake, the combination with a brake pipe, of a brake valve device adapted in service position to effect a reduction in brake pipe pressure at a rate substantially greater than the usual service rate, a brake controlling valve device movable to a service application position upon a reduction in brake pipe pressure and to an emergency application position upon a sufficiently rapid rate of reduction in brake pipe pressure, and means for preventing movement of said valve device to emergency application position until the brake pipe pressure has been reduced below a predetermined uniform pressure.

3. In a fluid pressure brake, the combination with a brake pipe and a brake controlling valve device operative upon variations in brake pipe pressure to effect the operation of the brakes, of a brake valve device adapted when in service position to effect a reduction in brake pipe pressure at a rate substantially in excess of the usual service rate, and means for preventing said brake controlling valve device from operating to effect an emergency application of the brakes when said brake valve is in service position.

4. In a fluid pressure brake, the combination with a brake pipe and a brake controlling valve device operative upon variations in brake pipe pressure to effect the operation of the brakes, of a brake valve device adapted when in service position to effect a reduction in brake pipe pressure at a rate substantially in excess of the usual service rate, and means for causing said brake controlling valve device to be responsive to such rate of reduction in brake pipe pressure in excess of the usual service rate to effect only a service application, said means including means effective when said brake valve device is in service position to limit the reduction in brake pipe pressure to a predetermined amount, and means effective upon a reduction in brake pipe pressure less than said predetermined amount for preventing said brake controlling valve device from operating to effect an emergency application of the brakes.

5. In a fluid pressure brake, the combination with a brake pipe and a brake controlling valve device operative upon variations in brake pipe pressure to effect the operation of the brakes, of a brake valve device adapted when in service position to effect a reduction in brake pipe pressure at a rate substantially in excess of the usual service rate, and means for causing said brake controlling valve device to be responsive to such rate of reduction in brake pipe pressure in excess of the usual service rate to effect only a service application, said means including means effective when said brake valve device is in service position to limit the reduction in brake pipe pressure to a predetermined amount, and means comprising a movable abutment differentially subject to the opposing forces exerted by brake pipe pressure effective on opposite sides thereof and effective upon a reduction in brake pipe pressure less than said predetermined amount for preventing said brake controlling valve device from operating to effect an emergency application of the brakes.

6. In a fluid pressure brake, the combination with a brake pipe and a brake controlling valve device having fluid pressure responsive means subject to brake pipe pressure and operative to one position to effect a service application of the brakes and to another position to effect an emergency application of the brakes, in response to variations in brake pipe pressure, of a brake valve device adapted when in service position to effect a reduction in brake pipe pressure at a rate substantially in excess of the usual service rate, and means for causing said brake controlling valve device to be responsive to such rate of reduction in brake pipe pressure in excess of the usual service rate to effect only a service application, said means including means effective when said brake valve device is in service position to limit the reduction in brake pipe pressure to a predetermined amount, and means engageable by said fluid pressure responsive means and effective upon a reduction in brake pipe pressure less than said predetermined amount for preventing said fluid pressure responsive means from operating to the position for effecting an emergency application of the brakes.

7. In a fluid pressure brake, the combination with a brake pipe, of a brake controlling valve device having fluid pressure responsive means subject to brake pipe pressure and operative upon a reduction in brake pipe pressure at an emergency rate to move successively into a service application position and an emergency application position, of means for resisting movement of said fluid pressure responsive means from service application position to emergency application position in effecting an emergency application of the brakes until the brake pipe pressure is reduced below a predetermined pressure regardless of the rate of reduction in brake pipe pressure, after which said means yields to the fluid pressure force acting to move said fluid pressure responsive means and permits said fluid pressure responsive means to move into emergency application position.

8. In a fluid pressure brake, the combination with a brake pipe, a brake cylinder, and a brake controlling valve device movable into a service application position upon a reduction in brake pipe pressure and to an emergency application position upon a sufficiently rapid rate of reduction in brake pipe pressure, of a movable abutment adapted to be maintained in one position as long as the brake pipe pressure does not reduce below a predetermined pressure to prevent movement of said valve device to emergency position and adapted to be moved out of said one position only when the brake pipe pressure reduces below said predetermined pressure to permit said valve device to move into emergency position.

9. In a fluid pressure brake, the combination with a brake pipe, a brake cylinder, and a brake controlling valve device movable to a service application position in which fluid under pressure is supplied to the brake cylinder upon a reduction in brake pipe pressure and to emergency application position in which fluid under pressure is supplied to the brake cylinder upon a sufficiently rapid rate of reduction in brake pipe pressure, of a movable abutment differentially subject to the opposing forces exerted by brake pipe pressure on opposite sides thereof as long as the brake pipe pressure exceeds a predetermined value, for preventing movement of said brake controlling valve device to emergency application position.

10. In a fluid pressure brake, the combination with a brake pipe, a brake cylinder, and a brake controlling valve device movable to a service application position in which fluid under pressure is supplied to the brake cylinder upon a reduction in brake pipe pressure and to emergency application position in which fluid under pressure is supplied to the brake cylinder upon a sufficiently rapid rate of reduction in brake pipe pressure, of a movable abutment differentially subject to the opposing forces exerted by brake pipe pressure on opposite sides thereof in constant ratio regardless of the rate of reduction in brake pipe pressure as long as the brake pipe pressure exceeds a predetermined value, for preventing movement of said brake controlling valve device to emergency application position.

11. In a fluid pressure brake, the combination with a brake pipe, a brake cylinder, and a brake controlling valve device movable to a service application position in which fluid under pressure is supplied to the brake cylinder upon a reduction in brake pipe pressure and to emergency application position in which fluid under pressure is supplied to the brake cylinder upon a sufficiently rapid rate of reduction in brake pipe pressure, of a movable abutment differentially subject to the opposing forces exerted by brake pipe pressure on opposite sides thereof as long as the brake pipe pressure exceeds a predetermined value, for preventing movement of said brake controlling valve device to emergency application position, and means for preventing a reduction in brake pipe pressure below said predetermined value.

12. In a fluid pressure brake, the combination with a brake pipe, a brake cylinder, and a brake controlling valve device movable to a service application position in which fluid under pressure is supplied to the brake cylinder upon a reduction in brake pipe pressure and to emergency application position in which fluid under pressure is supplied to the brake cylinder upon a sufficiently rapid rate of reduction in brake pipe pressure, of a movable abutment differentially subject to the opposing forces exerted by brake pipe pressure on opposite sides thereof in constant ratio regardless of the rate of reduction in brake pipe pressure as long as the brake pipe pressure exceeds a predetermined value, for preventing movement of said brake controlling valve device to emergency application position, and means for preventing a reduction in brake pipe pressure below said predetermined value.

13. In a fluid pressure brake, the combination with a brake pipe, a brake cylinder, and a brake controlling valve device movable to a service application position in which fluid under pressure is supplied to the brake cylinder upon a reduction in brake pipe pressure and to emergency application position in which fluid under pressure is supplied to the brake cylinder upon a sufficiently rapid rate of reduction in brake pipe pressure, of a movable abutment constantly subject on the entire one side thereof to brake pipe pressure and on the other side in part to brake pipe pressure and in part to atmospheric pressure as long as the brake pipe pressure exceeds a predetermined value, the differential in the fluid pressures acting on said abutment being effective to cause said abutment to prevent movement of said brake controlling valve device into emergency application position as long as the brake pipe pressure exceeds the said predetermined value.

14. In a fluid pressure brake, the combination with a brake pipe, a brake cylinder, and a brake controlling valve device movable to a service application position in which fluid under pressure is supplied to the brake cylinder upon a reduction in brake pipe pressure and to emergency application position in which fluid under pressure is supplied to the brake cylinder upon a sufficiently rapid rate of reduction in brake pipe pressure, of means for preventing movement of said valve device to emergency position in response to said sufficiently rapid rate of reduction in brake pipe pressure, as long as the brake pipe pressure does not reduce below predetermined uniform pressure.

15. In a fluid pressure brake, the combination with a brake pipe, a brake cylinder, and a brake controlling valve device movable to a service application position in which fluid under pressure is supplied to the brake cylinder upon a reduction in brake pipe pressure and to emergency application position in which fluid under pressure is supplied to the brake cylinder upon a sufficiently rapid rate of reduction in brake pipe pressure, of means effective to prevent movement of said valve device to emergency position regardless of the rate of reduction in brake pipe pressure, and means operative upon a reduction in brake pipe pressure below a predetermined pressure for rendering said last means ineffective.

16. In a fluid pressure brake, the combination with a brake pipe, a brake cylinder, and a brake controlling valve device movable to a service application position in which fluid under pressure is supplied to the brake cylinder upon a reduction in brake pipe pressure and to emergency application position in which fluid under pressure is supplied to the brake cylinder upon a sufficiently rapid rate of reduction in brake pipe pressure, of a movable abutment differentially subject to the opposing forces exerted by fluid under pressure acting on opposite sides thereof for preventing movement of said valve device to emergency position regardless of the rate of reduction in brake pipe pressure, and means operative upon a reduction in brake pipe pressure below a predetermined pressure for effecting the equalization of fluid pressure forces acting on said abutment and thereby rendering said abutment ineffective to prevent movement of said valve device to emergency position.

17. In a fluid pressure brake, the combination with a brake pipe, a brake cylinder, and a brake controlling valve device movable to a service application position in which fluid under pressure is supplied to the brake cylinder upon a reduction in brake pipe pressure and to emergency application position in which fluid under pressure is supplied to the brake cylinder upon a sufficiently rapid rate of reduction in brake pipe pressure, of graduating means for restraining movement of said valve device from service position to emergency position, a movable abutment adapted to be maintained in one position as long as the brake pipe pressure does not reduce below a predetermined pressure to prevent movement of said valve device to emergency position and adapted to be moved out of said one position only when the brake pipe pressure reduces below said predetermined pressure to permit said valve device to move into emergency position, and a spring adapted to aid in the return of said abutment to said one position.

JOHN B. HULL.